(12) United States Patent
O'Leary

(10) Patent No.: US 8,140,959 B2
(45) Date of Patent: Mar. 20, 2012

(54) METHOD AND A PROGRAM FOR ESTIMATING BUILDING MATERIAL QUANTITIES

(76) Inventor: John P. O'Leary, Florence, MA (US)

( * ) Notice: Subject to any disclaimer, the term of this patent is extended or adjusted under 35 U.S.C. 154(b) by 781 days.

(21) Appl. No.: 11/698,768

(22) Filed: Jan. 25, 2007

(65) Prior Publication Data

US 2007/0192677 A1 Aug. 16, 2007

Related U.S. Application Data

(60) Provisional application No. 60/762,662, filed on Jan. 26, 2006.

(51) Int. Cl.
*G06F 17/20* (2006.01)
(52) U.S. Cl. ...................................................... 715/212
(58) Field of Classification Search .................. 715/212
See application file for complete search history.

(56) References Cited

U.S. PATENT DOCUMENTS

| | | | |
|---|---|---|---|
| 2002/0165744 A1* | 11/2002 | Juras et al. | 705/7 |
| 2003/0028393 A1* | 2/2003 | Coulston et al. | 705/1 |
| 2003/0050883 A1* | 3/2003 | Weir et al. | 705/35 |
| 2004/0143475 A1* | 7/2004 | Kilburn et al. | 705/8 |
| 2005/0154650 A1* | 7/2005 | McMullen et al. | 705/27 |
| 2006/0155634 A1* | 7/2006 | Woodard | 705/37 |
| 2009/0037297 A1* | 2/2009 | Dixel et al. | 705/27 |

\* cited by examiner

*Primary Examiner* — Doug Hutton, Jr.
*Assistant Examiner* — Andrew Dyer

(57) ABSTRACT

A method and a computer program for estimating item quantities in a building project that includes one or more items. The method includes steps for providing a spreadsheet template including a summary worksheet and one or more input worksheets with a plurality of cells for estimating a quantity of an item in a building project comprising one or more items, receiving a value of a parameter inputted by a user in a predetermined cell of an input worksheet, calculating the quantity of the item based on the value and a formula for the item, and generating a list including the quantity of the item on the summary worksheet. The program includes codes for performing the method and the spreadsheet template may be used by a spreadsheet program such as MICROSOFT EXCEL.

15 Claims, 19 Drawing Sheets

| | A | B | C | D | E | F |
|---|---|---|---|---|---|---|
| | F29 | =IF(D29=0,0,"X") | | | | |
| 1 | MATERIALS LIST FOR PRICING | | | | | |
| 2 | | | | Formula | | |
| 3 | CONTRACTOR: | | | | | |
| 4 | JOB REFERENCE: | | | | | |
| 5 | | | | | | |
| 6 | | | | | | |
| 7 | CATEGORY | DESCRIPTION | PRODUCT | QTY | LENGTH | ZERO QTY? |
| 8 | SILL | SILL SEAL | ROLL | 0 | 50 FT | 0 |
| 9 | SILL | TREATED PLATES | 0 | 0 | 16FT | 0 |
| 10 | BASEMENT WALLS | EXT STUDS | 0 | 0 | 0 | 0 |
| 11 | BASEMENT WALLS | EXT PLATE | 0 | 0 | 16 | 0 |
| 12 | BASEMENT WALLS | EXT TREATED PLATE | 0 | 0 | 16 | 0 |
| 13 | BASEMENT WALLS | INT STUDS | 0 | 0 | 0 | 0 |
| 14 | BASEMENT WALLS | INT PLATE | 0 | 0 | 16 | 0 |
| 15 | BASEMENT WALLS | INT TREATED PLATE | 0 | 0 | 16 | 0 |
| 16 | BASEMENT WALLS | HEADERS | 0 | 0 | 0 | 0 |
| 17 | BASEMENT WALLS | SHEATHING | 0 | 0 | 4 X 8 | 0 |
| 18 | BASEMENT WALLS | PLATES FOR CURVED | 2 X 10 | 0 | 16 | 0 |
| 19 | 1ST FLOOR DECK | COLUMNS | 4" LALLY COLUMN | 0 | 9 FT | 0 |
| 20 | 1ST FLOOR DECK | SPRINGFIELD PLATES | 4" PLATE | 0 | N/A | 0 |
| 21 | 1ST FLOOR DECK | SUBFLOOR | 0 | 0 | 4 X 8 | 0 |
| 22 | 1ST FLOOR DECK | 32 OZ.TUBES OF GLUE | 0 | 0 | N/A | 0 |
| 23 | 1ST FLOOR DECK | JOIST | 0 | 0 | 0 | 0 |
| 24 | 1ST FLOOR DECK | JOIST | 0 | 0 | 0 | 0 |
| 25 | 1ST FLOOR DECK | JOIST | 0 | 0 | 0 | 0 |
| 26 | 1ST FLOOR DECK | JOIST | 0 | 0 | 0 | 0 |

FIG. 1

| | A | B | C | D | E | F | G | H | I |
|---|---|---|---|---|---|---|---|---|---|
| 1 | FLOOR SYSTEMS (CONVENTIONAL AND E-WOOD) | | | | | | | | |
| 2 | | | | | | | | | |
| 3 | SEPARATED INTO 4 CATEGORIES BELOW: | | | | | | | | |
| 4 | | A) | COLUMNS | | | | | | |
| 5 | | B) | JOISTS | | | | | | |
| 6 | | C) | BEAMS | | | | | | |
| 7 | | D) | BONUS ROOM OVER GARAGE | | | | | | |
| 8 | | | | | | | | | |
| 9 | A) | | | | | | | | |
| 10 | COLUMNS | | ENTER TOTAL # OF BASEMENT LALLY COLUMNS HERE = | | | | | | 0 |
| 11 | | | (INCLUDES COLUMNS IN GARAGE) | | | | | | |
| 12 | B) | | | | | | | | |
| 13 | JOISTS | | * see diagram below for terminology * | | | | | | |
| 14 | | | | | | | | | |
| 15 | FIRST FLOOR | | | | | SECOND FLOOR | | | |
| 16 | JOIST SIZE | | | 0 | | JOIST SIZE | | 0 | |
| 17 | | | | | | | | | |
| 18 | AREAS | JOIST LENGTH | LENGTH OF AREA | QTY @ 16" O.C. | | AREAS | JOIST LENGTH | LENGTH OF AREA | QTY @ 16" O.C. |
| 19 | 1 | 0 | 0 | 0 | | 1 | 0 | 0 | 0 |
| 20 | 2 | 0 | 0 | 0 | | 2 | 0 | 0 | 0 |
| 21 | 3 | 0 | 0 | 0 | | 3 | 0 | 0 | 0 |
| 22 | 4 | 0 | 0 | 0 | | 4 | 0 | 0 | 0 |
| 23 | 5 | 0 | 0 | 0 | | 5 | 0 | 0 | 0 |
| 24 | 6 | 0 | 0 | 0 | | 6 | 0 | 0 | 0 |
| 25 | 7 | 0 | 0 | 0 | | 7 | 0 | 0 | 0 |

FIG. 2

| | A | B | C | D | E | F | G | H | I |
|---|---|---|---|---|---|---|---|---|---|
| 1 | FLOOR SYSTEMS (CONVENTIONAL AND E-WOOD) | | | | | | | | |
| 2 | | | | | | | | | |
| 3 | *SEPARATED INTO 4 CATEGORIES BELOW:* | | | | | | | | |
| 4 | | A) COLUMNS | | | | | | | |
| 5 | | B) JOISTS | | | | Formula | | | |
| 6 | | C) BEAMS | | | | | | | |
| 7 | | D) BONUS ROOM OVER GARAGE | | | | | | | |
| 8 | | | | | | | | | |
| 9 | A) | | | | | | | | |
| 10 | COLUMNS | | ENTER TOTAL # OF BASEMENT LALLY COLUMNS HERE = | | | | | | 7 |
| 11 | | | (INCLUDES COLUMNS IN GARAGE) | | | | | | |
| 12 | B) | | | | | | | | |
| 13 | *JOISTS* | | * see diagram below for terminology * | | | | | | |
| 14 | | | | | | | | | |
| 15 | FIRST FLOOR | | | | SECOND FLOOR | | | | |
| 16 | JOIST SIZE | | 2x10 | | JOIST SIZE | | | 0 | |
| 17 | | | | | | | | | |
| 18 | AREAS | JOIST LENGTH | LENGTH OF AREA | QTY @ 16" O.C. | AREAS | JOIST LENGTH | LENGTH OF AREA | QTY @ 16" O.C. | |
| 19 | 1 | 12 | 16 | 13 | 1 | 0 | 0 | 0 | |
| 20 | 2 | 10 | 8 | 7 | 2 | 0 | 0 | 0 | |
| 21 | 3 | 14 | 18 | 14.5 | 3 | 0 | 0 | 0 | |
| 22 | 4 | 8 | 6 | 5.5 | 4 | 0 | 0 | 0 | |
| 23 | 5 | 0 | 0 | 0 | 5 | 0 | 0 | 0 | |
| 24 | 6 | 0 | 0 | 0 | 6 | 0 | 0 | 0 | |
| 25 | 7 | 0 | 0 | 0 | 7 | 0 | 0 | 0 | |

STUD COUNT

*SEPARATED INTO 2 CATEGORIES BELOW:*
- A) STRAIGHT WALLS
- B) CURVED WALLS

STUD LENGTH (8 FT, 10FT, PRECUT, ETC.)

| | 1ST FLOOR | 2ND FLOOR | 3RD FLOOR | BASEMENT | GARAGE |
|---|---|---|---|---|---|
| LENGTH | 0 | 0 | 0 | 0 | 0 |

WALL THICKNESS

| EXTERIOR | INTERIOR | GARAGE |
|---|---|---|
| 0 | 0 | 0 |

A)
STRAIGHT WALLS

EXTERIOR WALLS 16" O.C.

| | LIN.FT. OF WALL | QTY @ 16" O.C. | # OF OUTSIDE CORNERS | # OF WINDOWS | # OF INSIDE CORNERS | # OF DOORS | TOTAL STUD COUNT |
|---|---|---|---|---|---|---|---|
| 1ST FLOOR | 0 | 0 | 0 | 0 | 0 | 0 | 0 |
| 2ND FLOOR *note* | 0 | 0 | 0 | 0 | 0 | 0 | 0 |
| 3RD FLOOR | 0 | 0 | 0 | 0 | 0 | 0 | 0 |
| BASEMENT | 0 | 0 | 0 | 0 | 0 | 0 | 0 |
| GARAGE | 0 | 0 | 0 | 0 | 0 | 0 | 0 |

FIG. 4

| | A | B | C | D | E | F | G | H | I |
|---|---|---|---|---|---|---|---|---|---|
| 1 | HEADERS | | | | | | | | |
| 2 | | | | | | | | | |
| 3 | SEPARATED INTO 2 CATEGORIES BELOW: | | | | | | | | |
| 4 | A) | WINDOW / DOOR / CASED OPENING | | | | | | | |
| 5 | B) | LVLs FOR GARAGE DOORS | | | | | | | |
| 6 | | | | | | | | | |
| 7 | LUMBER SIZE | 0 | | PREFERRED LENGTH | 0 | FT | # OF PLIES | 0 | |
| 8 | | | | | | | | | |
| 12 | A) | | | | | | | | |
| 13 | WINDOW/ DOOR / CASED OPENING | | | | | | | | |
| 14 | | | | | | | | | |
| 15 | EXTERIOR | | * enter total lin ft for each side * | | | | | | |
| 16 | | 1ST FLOOR | 2ND FLOOR | 3RD FLOOR | BASEMENT | GARAGE | | | |
| 17 | FRONT | 0 | 0 | 0 | 0 | 0 | | | |
| 18 | BACK | 0 | 0 | 0 | 0 | 0 | | | |
| 19 | LEFT | 0 | 0 | 0 | 0 | 0 | | | |
| 20 | RIGHT | 0 | 0 | 0 | 0 | 0 | | | |
| 21 | TOTAL | 0 | 0 | 0 | 0 | 0 | | | |
| 22 | # OF STICKS | 0 | 0 | 0 | 0 | 0 | | | |
| 23 | | | | | | | | | |
| 24 | INTERIOR | | | | | | | | |
| 25 | | 1ST FLOOR | 2ND FLOOR | 3RD FLOOR | BASEMENT | | | | |
| 26 | LIN FT ABOVE DOORS | 0 | 0 | 0 | 0 | * based on a 3 ft average * | | | |

FIG. 5

| | A | B | C | D | E | F | G | H |
|---|---|---|---|---|---|---|---|---|
| 1 | CEILINGS | | | | | | | |
| 2 | | | | | | | | |
| 3 | *SEPARATED INTO 3 CATEGORIES BELOW:* | | | | | | | |
| 4 | A) | JOISTS | | | | | | |
| 5 | B) | BEAMS | | | | | | |
| 6 | C) | TRAY CEILING COMPONENTS | | | | | | |
| 7 | | | | | | | | |
| 8 | NOTE: *There is no section for cathedral ceiling areas. This is because* | | | | | | | |
| 9 | *they are usually made from scissor trusses or rafters with a* | | | | | | | |
| 10 | *structural ridge* | | | | | | | |
| 11 | | | | | | | | |
| 12 | A) | | | | | | | |
| 13 | *JOISTS* | | | | | | | |
| 14 | | | | | | | | |
| 15 | JOIST SIZE = | | 0 | | | | | |
| 16 | | | | | | | | |
| 17 | AREAS | LENGTH OF JOIST | WIDTH OF JOIST AREA | QTY @ 16" O.C. | | | | |
| 18 | 1 | 0 | 0 | 0 | | | | |
| 19 | 2 | 0 | 0 | 0 | | | | |
| 20 | 3 | 0 | 0 | 0 | | | | |
| 21 | 4 | 0 | 0 | 0 | | | | |
| 22 | 5 | 0 | 0 | 0 | | | | |
| 23 | 6 | 0 | 0 | 0 | | | | |
| 24 | 7 | 0 | 0 | 0 | | | | |
| 25 | 8 | 0 | 0 | 0 | | | | |
| 26 | 9 | 0 | 0 | 0 | | | | |
| 27 | 10 | 0 | 0 | 0 | | | | |

FIG. 6

| | A | B | C | D | E | F | G |
|---|---|---|---|---|---|---|---|
| 1 | PLYWOOD | | | | | | |
| 2 | | | | | | | |
| 3 | SEPARATED INTO 2 CATEGORIES BELOW: | | | | | | |
| 4 | | A) SUBFLOOR | | | | | |
| 5 | | B) WALL SHEATHING | | | | | |
| 6 | | | | | | | |
| 7 | NOTE: Do not include gable areas at this time | | | | | | |
| 8 | | | | | | | |
| 9 | PRODUCTS TO BE USED | | | | | | |
| 10 | SUBFLOOR | | SUBFLOOR GLUE | | SHEATHING | | |
| 11 | 0 | | 0 | | 0 | | |
| 12 | | | | | | | |
| 13 | A) | | | | | | |
| 14 | SUBFLOOR | | | | | | |
| 15 | | | | | | | |
| 16 | | AREA (SQ.FT) | # OF 4 X 8 SHEETS | | | | |
| 17 | 1ST FLOOR | 0 | 0 | | | | |
| 18 | 2ND FLOOR | 0 | 0 | | | | |
| 19 | BONUS ROOM OVER GARAGE | 0 | 0 | | | | |
| 20 | 3RD FLOOR | 0 | 0 | | | | |
| 22 | | | | | | | |
| 23 | * front/ back/ left / right can be renamed to match blueprints * | | | | | | |
| 24 | | | | | | | |
| 25 | B) | | | | | | |
| 26 | SHEATHING | | | | | | |

FIG. 7

| | A | B | C | D | E | F | G | H |
|---|---|---|---|---|---|---|---|---|
| 1 | ROOF FRAMING | | | | | | | |
| 2 | *SEPARATED INTO 10 CATEGORIES BELOW:* | | | | | | | |
| 3 | A) | COMMON RAFTERS | | | | | | |
| 4 | B) | RIDGE | | | | *all figures for pitch must | | |
| 5 | C) | COLLAR TIES | | | | 2,3,4,5,6,7,8,9,10,11,12 | | |
| 6 | D) | HIP AREA | | | | | | |
| 7 | E) | VALLEY AREA | | | | | | |
| 8 | F) | OVERFRAMED AREAS | | | | | | |
| 9 | G) | UNUSUAL SCENARIOS | | | | | | |
| 10 | H) | DOGHOUSE DORMERS | | | | | | |
| 11 | I) | BAY WINDOW ROOF | | | | | | |
| 12 | J) | TRUSSES | | | | | | |
| 13 | | | | | | | | |
| 14 | RAFTER SIZE | 2 x 8 | | | | | | |
| 15 | | | | | | | | |
| 16 | A) | | | | * "LOW PITCH REFERS TO 2-7, | | | |
| 17 | COMMON RAFTERS | | | | "HIGH PITCH" refers to 8,9,10,11,12 a | | | |
| 18 | | | | | | | | |
| 19 | | FLAT AREA ON PRINTS INCLUDE OVERHANGS) | PITCH | WIDTH OF RAFTER AREA | RAFTER LENGTH (LOW PITCH) | RAFTER LENGTH (HIGH PITCH) | QTY @ 16" O.C. | |
| 20 | 1 | 0 | 0 | 0 | 0 | 0 | 0 | |
| 21 | 2 | 0 | 0 | 0 | 0 | 0 | 0 | |
| 22 | 3 | 0 | 0 | 0 | 0 | 0 | 0 | |
| 23 | 4 | 0 | 0 | 0 | 0 | 0 | 0 | |
| 24 | 5 | 0 | 0 | 0 | 0 | 0 | 0 | |
| 25 | 6 | 0 | 0 | 0 | 0 | 0 | 0 | |

FIG. 9

ROOF AREA (INCLUDE PORCHES)

PRODUCTS TO BE USED

| SHINGLES | BUNDLES PER SQUARE | SHEATHING | DRIP EDGE | HIP & RIDGE |
|---|---|---|---|---|
| 0 | 0 | 0 | 0 | 0 |

| PITCH | TOTAL FLAT AREA (SQ.FT.) INCLUDING OVERHANGS | ACTUAL SURFACE AREA |
|---|---|---|
| 2/12 | 0 | 0 |
| 3/12 | 0 | 0 |
| 4/12 | 0 | 0 |
| 5/12 | 0 | 0 |
| 6/12 | 0 | 0 |
| 7/12 | 0 | 0 |
| 8/12 | 0 | 0 |
| 9/12 | 0 | 0 |
| 10/12 | 0 | 0 |
| 11/12 | 0 | 0 |
| 12/12 | 0 | 0 |
| 14/12 | 0 | 0 |
| 20/12 | 0 | 0 |

FIG. 10

| | A | B | C | D | E | F | G |
|---|---|---|---|---|---|---|---|
| 1 | PLYWOOD SOFFIT | | | *see diagram* * | | | |
| 2 | | LOCATION (SCALE FROM SIDE ELEVATIONS) | LIN FT OF SOFFIT | 2 X 4 X 16 FOR LOOKOUTS AND SUB FACIA | LIN FT OF 1 X 6 FACIA | # SHEETS OF 1/2" A.C. PLYWOOD | LIN FT O 1 X 8 FRIE |
| 3 | RAKES WITH 12" O.H. | FRONT | 0 | 0 | 0 | 0 | 0 |
| 4 | | BACK | 0 | 0 | 0 | 0 | 0 |
| 5 | | LEFT | 0 | 0 | 0 | 0 | 0 |
| 6 | | RIGHT | 0 | 0 | 0 | 0 | 0 |
| 7 | RAKES WITH 16" O.H. | FRONT | 0 | 0 | 0 | 0 | 0 |
| 8 | | BACK | 0 | 0 | 0 | 0 | 0 |
| 9 | | LEFT | 0 | 0 | 0 | 0 | 0 |
| 10 | | RIGHT | 0 | 0 | 0 | 0 | 0 |
| 11 | LENGTH OF EAVES | FRONT | 0 | 0 | 0 | 0 | 0 |
| 12 | | BACK | 0 | 0 | 0 | 0 | 0 |
| 13 | | LEFT | 0 | 0 | 0 | 0 | 0 |
| 14 | | RIGHT | 0 | 0 | 0 | 0 | 0 |
| 15 | | | 0 | 0 | 0 | 0 | 0 |

CROSS SECTION OF TYPICAL SOFFIT AT EAVES

NOTE:
Rake ends with an over
2 x 4's (lookouts) to cre
This is used to attach c
in place of rafter tails. T
for in calculations above

FIG. 11

| | A | B | C | D | E | F | G |
|---|---|---|---|---|---|---|---|
| 1 | DECKS | QUOTE UP TO 3 SEPARATELY AND LABEL THEM ANY WAY YO| | | | | |
| 2 | | | | | | | |
| 3 | DECK 1 | LABEL | HEIGHT (IN FEET) | BEAM SIZE | JOIST SIZE | FACIA SIZE | LENG OF BALLUS |
| 4 | | BACK DECK | 0 | 0 | 0 | 0 | 0 |
| 5 | | | | | | | |
| 6 | *FOOTINGS* | # OF FOTINGS | # OF 4 FOOT X 10"TUBES | #OF 80 LB BAGS OF CNCRETE MIX | # OF 1/2" X 8" ANCHOR BOLTS | # OF POST BASES | 4 X 4 FO POS |
| 7 | | 0 | 0 | 0 | 0 | 0 | 0 |
| 8 | | | | | | | |
| 9 | *BEAMS* | LENGTH OF BEAM | # OF PLIES | | *JOISTS* | LENGTH OF JOIST | WIDTH JOIST |
| 10 | BEAM 1 | 0 | 0 | | JOIST AREA 1 | 0 | 0 |
| 11 | BEAM 2 | 0 | 0 | | JOIST AREA 2 | 0 | 0 |
| 12 | BEAM 3 | 0 | 0 | | JOIST AREA 3 | 0 | 0 |
| 13 | | | | | | | |
| 14 | *RAILINGS 6 FOOT SECTIONS* | # OF 6 FOOT RAIL SECTIONS | # OF BALLUSTERS @ 4 1/2" O.C. | # OF 2 X 4 X 12 FOR TOP & BOTTOM | # OF 5/4 X 6 X 12 TOP | # OF POSTS (4 FOOT STICK) | |
| 15 | | 0 | 0 | 0 | 0 | 0 | |
| 16 | *see diagram * | | | | | | |
| 17 | | | | | | | |
| | *RAILINGS* | # OF 8 FOOT | # OF BALLUSTERS | # OF 2 X 4 X 8 | # OF | | |

FIG. 12

| | A | B | C | D | E | F |
|---|---|---|---|---|---|---|
| 1 | COVERED PORCHES | | ROOFING MATERIALS LISTED UNDER "ROOFIN( | | | |
| 2 | | | IF IT'S A WRAP AROUND, DO SEPARATE SIDES | | | |
| 3 | | | SEPARATE PORCHES (UP TO 3) | | | |
| 4 | | | | | | |
| 5 | PORCH 1 | LABEL | BEAM SIZE | JOIST SIZE | FACIA SIZE (GROUND) | FACIA SIZE (EAVES) |
| 6 | | FRONT PORCH | 0 | 0 | 0 | 0 |
| 7 | | | | | | |
| 8 | *FOOTINGS* | # OF FOTINGS | # OF 4 FOOT X 10" TUBES | #OF 80 LB BAGS OF CNCRETE MIX) | # OF 1/2" X 8" ANCHOR BOLTS | # OF POST BASES |
| 9 | | 0 | 0 | 0 | 0 | 0 |
| 10 | | | | | | |
| 11 | *BEAMS* | LENGTH OF BEAM | # OF PLIES | | *JOISTS* | LENGTH OF JOIST |
| 12 | BEAM 1 | 0 | 0 | | | 0 |
| 13 | BEAM 2 | 0 | 0 | | | |
| 14 | | | | | | |
| 15 | *RAILINGS 6 FOOT SECTIONS* | # OF 6 FOOT RAIL SECTIONS | # OF BALLUSTERS @ 4 1/2" O.C. | # OF 2 X 4 X 12 FOR TOP & BOTTOM | # OF 5/4 X 6 X 12 TOP | # OF POSTS (4 FOOT STICK) |
| 16 | | 0 | 0 | 0 | 0 | 0 |
| 17 | | | | | | |
| 18 | *RAILINGS 8 FOOT SECTIONS* | # OF 8 FOOT RAIL SECTIONS | # OF BALLUSTERS @ 4 1/2" O.C. | # OF 2 X 4 X 8 FOR TOP & BOTTOM | # OF 5/4 X 6 X 8 TOP | # OF POSTS (4 FOOT STICK) |

FIG. 13

| | A | B | C | D | E | F |
|---|---|---|---|---|---|---|
| 1 | STAIRS | | | | | |
| 2 | *\* finished stair parts should be quoted with help from the manufacturer - too many option* | | | | | |
| 3 | *SEPARATED INTO 3 CATEGORIES BELOW:* | | | | | |
| 4 | | A) TEMPORARY ROUGH STAIRS | | | | |
| 5 | | B) CELLAR BULKHEAD UNITS | | | | |
| 6 | | C) ATTIC PULLDOWN UNITS | | | | |
| 7 | | C) SPIRAL STAIR UNITS | | | | |
| 8 | | | | | | |
| 9 | A) | | | | | |
| 10 | TEMPORARY ROUGH STAIRS | | | | | |
| 11 | | | | | | |
| 12 | # OF STAIRWAYS | # OF 2 X 12 X 16 STRINGERS | # OF 2 X 12 X 12 TREADS | # OF 16 FT HANDRAIL | | |
| 13 | 0 | 0 | 0 | 0 | | |
| 14 | | | | | | |
| 15 | B) | | | | | |
| 16 | CELLAR BULKHEAD UNITS | | | | | |
| 17 | MANUFACTURER'S MODEL # | # OF UNITS | | | | |
| 18 | 0 | 0 | | | | |
| 19 | | | | | | |
| 20 | B) | | | | | |
| 21 | ATTIC PULLDOWN UNITS | | | | | |
| 22 | MANUFACTURER'S MODEL # | # OF UNITS | | | | |
| 23 | 0 | 0 | | | | |
| 24 | | | | | | |

FIG. 14

| | A | B | C | D | E | F |
|---|---|---|---|---|---|---|
| 1 | WINDOWS | | | | | |
| 2 | | | | | | |
| 3 | *SEPARATED INTO 3 CATEGORIES BELOW:* | | | | | |
| 4 | A) | NEW CONSTRUCTION | | | | |
| 5 | B) | REPLACEMENT | | | | |
| 6 | | | | | | |
| 7 | A) | | | | | |
| 8 | NEW CONSTRUCTION | | | | | |
| 9 | | | | | | |
| 10 | | JAMB THICKNESS | 6 9/16 | | | |
| 11 | | LOW E GLASS ( Y/ N) | y | | | |
| 12 | | EXTERIOR COLOR | WHITE | | | |
| 13 | | EXTERIOR WOOD / CLAD / VINYL | CLAD | | | |
| 14 | | INTERIOR PREPRIMED OR PREFINISHED (Y/N) | NO | | | |
| 15 | | HARDWARE COLOR | WHITE | | | |
| 16 | | TYPE OF GRILLE | GRILLE BETWEEN GLASS | | | |
| 17 | | | | | | |
| 18 | | | | | | |
| 19 | *FIRST FLOOR* | | | | | |
| 20 | | | | | | |
| 21 | | PLAN SIZE (FROM ELEVATIONS OR WINDOW SCHEDULE | TYPE (DH,CSMT, DH-2W ETC) | MODEL # | ROUGH OPENING | QTY |
| 22 | FRONT | 5'0" x 4'6" | DH-2W | ? | 60 3/4" X 54 1/2" | 2 |
| 23 | FRONT | 0 | 0 | 0 | 0 | 0 |

FIG. 15

| | A | B | C | D | E | F |
|---|---|---|---|---|---|---|
| 1 | MATERIALS LIST FOR PRICING | | | | | |
| 2 | | | | | | |
| 3 | CONTRACTOR: | | | | | |
| 4 | JOB REFERENCE: | | | | | |
| 5 | | | | | | |
| 6 | | | | | | |
| 7 | CATEGORY | DESCRIPTION | PRODUCT | QTY | LENGTH | ZERO QTY? |
| 8 | SILL | SILL SEAL | ROLL | 0 | 50 FT | 0 |
| 9 | SILL | TREATED PLATES | 0 | 0 | 16FT | 0 |
| 10 | BASEMENT WALLS | EXT STUDS | 0 | 0 | 0 | 0 |
| 11 | BASEMENT WALLS | EXT PLATE | 0 | 0 | 16 | 0 |
| 12 | BASEMENT WALLS | EXT TREATED PLATE | 0 | 0 | 16 | 0 |
| 13 | BASEMENT WALLS | INT STUDS | 0 | 0 | 0 | 0 |
| 14 | BASEMENT WALLS | INT PLATE | 0 | 0 | 16 | 0 |
| 15 | BASEMENT WALLS | INT TREATED PLATE | 0 | 0 | 16 | 0 |
| 16 | BASEMENT WALLS | HEADERS | 0 | 0 | 0 | 0 |
| 17 | BASEMENT WALLS | SHEATHING | 0 | 0 | 4 X 8 | 0 |
| 18 | BASEMENT WALLS | PLATES FOR CURVED | 2 X 10 | 0 | 16 | 0 |
| 19 | 1ST FLOOR DECK | COLUMNS | 4" LALLY COLUMN | 7 | 9 FT | X |
| 20 | 1ST FLOOR DECK | SPRINGFIELD PLATES | 4" PLATE | 7 | N/A | X |
| 21 | 1ST FLOOR DECK | SUBFLOOR | 0 | 0 | 4 X 8 | 0 |
| 22 | 1ST FLOOR DECK | 32 OZ.TUBES OF GLUE | 0 | 0 | N/A | 0 |
| 23 | 1ST FLOOR DECK | JOIST | 2x10 | 13 | 12 | X |
| 24 | 1ST FLOOR DECK | JOIST | 2x10 | 7 | 10 | X |
| 25 | 1ST FLOOR DECK | JOIST | 2x10 | 15 | 14 | X |
| 26 | 1ST FLOOR DECK | JOIST | 2x10 | 6 | 8 | X |
| 27 | 1ST FLOOR DECK | JOIST | 2x10 | 0 | 0 | 0 |
| 28 | 1ST FLOOR DECK | JOIST | 2x10 | 0 | 0 | 0 |
| 29 | 1ST FLOOR DECK | JOIST | 2x10 | 0 | 0 | 0 |
| 30 | 1ST FLOOR DECK | JOIST | 2x10 | 0 | 0 | 0 |

FIG. 17

| | A | B | C | D | E | F |
|---|---|---|---|---|---|---|
| 1 | MATERIALS LIST FOR PRICING | | | | | |
| 2 | | | | | | |
| 3 | CONTRACTOR: | | | | | |
| 4 | JOB REFERENCE: | | | | | |
| 5 | | | | | | |
| 6 | | | | | | |
| 7 | CATEGORY | DESCRIPTION | PRODUCT | QTY | LENGTH | ZERO QTY? |
| 8 | SILL | SILL SEAL | ROLL | 0 | 50 (All) | |
| 9 | SILL | TREATED PLATES | 0 | 0 | 16 (Top 10...) (Custom...) | |
| 10 | BASEMENT WALLS | EXT STUDS | 0 | 0 | 0 | |
| 11 | BASEMENT WALLS | EXT PLATE | 0 | 0 | X | |
| 12 | BASEMENT WALLS | EXT TREATED PLATE | 0 | 0 | 16 | 0 |
| 13 | BASEMENT WALLS | INT STUDS | 0 | 0 | 0 | 0 |
| 14 | BASEMENT WALLS | INT PLATE | 0 | 0 | 16 | 0 |
| 15 | BASEMENT WALLS | INT TREATED PLATE | 0 | 0 | 16 | 0 |
| 16 | BASEMENT WALLS | HEADERS | 0 | 0 | 0 | 0 |
| 17 | BASEMENT WALLS | SHEATHING | 0 | 0 | 4 X 8 | 0 |
| 18 | BASEMENT WALLS | PLATES FOR CURVED | 2 X 10 | 0 | 16 | 0 |
| 19 | 1ST FLOOR DECK | COLUMNS | 4" LALLY COLUMN | 7 | 9 FT | X |
| 20 | 1ST FLOOR DECK | SPRINGFIELD PLATES | 4" PLATE | 7 | N/A | X |
| 21 | 1ST FLOOR DECK | SUBFLOOR | 0 | 0 | 4 X 8 | 0 |
| 22 | 1ST FLOOR DECK | 32 OZ.TUBES OF GLUE | 0 | 0 | N/A | 0 |
| 23 | 1ST FLOOR DECK | JOIST | 2x10 | 13 | 12 | X |
| 24 | 1ST FLOOR DECK | JOIST | 2x10 | 7 | 10 | X |
| 25 | 1ST FLOOR DECK | JOIST | 2x10 | 15 | 14 | X |
| 26 | 1ST FLOOR DECK | JOIST | 2x10 | 6 | 8 | X |
| 27 | 1ST FLOOR DECK | JOIST | 2x10 | 0 | 0 | 0 |
| 28 | 1ST FLOOR DECK | JOIST | 2x10 | 0 | 0 | 0 |

(Drop down menu)

FIG. 18

| | CATEGORY | DESCRIPTION | PRODUCT | QTY | LENGTH | ZERO QTY? |
|---|---|---|---|---|---|---|
| 19 | 1ST FLOOR DECK | COLUMNS | 4" LALLY COLUMN | 7 | 9 FT | X |
| 20 | 1ST FLOOR DECK | SPRINGFIELD PLATES | 4" PLATE | 7 | N/A | X |
| 23 | 1ST FLOOR DECK | JOIST | 2x10 | 13 | 12 | X |
| 24 | 1ST FLOOR DECK | JOIST | 2x10 | 7 | 10 | X |
| 25 | 1ST FLOOR DECK | JOIST | 2x10 | 15 | 14 | X |
| 26 | 1ST FLOOR DECK | JOIST | 2x10 | 6 | 8 | X |

MATERIALS LIST FOR PRICING

CONTRACTOR:
JOB REFERENCE:

FIG. 19

METHOD AND A PROGRAM FOR ESTIMATING BUILDING MATERIAL QUANTITIES

CROSS REFERENCE TO RELATED APPLICATIONS

This application claims priority under 35 U.S.C. §119 from U.S. Provisional Patent Application No. 60/762,662, filed on Jan. 26, 2006, which is hereby incorporated by reference in its entirety.

TECHNICAL FIELD

This invention general relates to methods and computer programs for estimating building material quantities in construction projects. Specifically, the invention relates to a method a program for estimating building material quantities by using a spreadsheet format specifying product names and categories.

BACKGROUND ART

There are a number of programs on the market for estimating building materials in a construction project. In the building material industry, the estimation process is commonly referred to as "doing a takeoff." Each of the programs requires that a user (referred to hereon as an estimator) to use a digitizer or the like in conjunction with the program. The digitizer is constructed similar to a computer mouse. An estimator moves the digitizer around and selects different items on a set of blueprints to get calculations on the items. The estimator selects an item under the program's prompt, and the digitizer takes measurements of the item. The measurements are then used to calculate material quantity of the item based on a known formula. There are different formulas for different items. Some of the formulas may be preset in the program and others may need to be defined by the estimator.

These computerized material estimation systems are very accurate when used properly. A major problem with them, however, is that they are very expensive. Normally, only large lumber dealers may purchase and install these systems. As the result, a contractor would have to rely on one particular distributor to accurately bid on a job. The contractor may also have to pay for this service. Another problem with the systems is that an estimator is supposed to know how to do a takeoff by hand with pencil, paper and scale ruler before attempting to use the system. This is not usually the case. People having some knowledge of computers but no takeoff experience falsely believe that the program will walk them through the estimate process without error. The problem surfaces when they select a wrong item on a print and resulting in incorrect results from the calculations. In addition, if the program asks an estimator to input a formula and the estimator does not have the correct formula, the program cannot be properly used. These systems also become an obstacle for experienced estimators who are not familiar with computer technologies. It may take them hours just to get the program set up correctly. For such individuals it is actually quicker to do a takeoff without the aid of a computer at all. In addition, a digitizer is a very sensitive piece of equipment. If a digitizer is damaged, the program associated with it becomes useless.

Therefore, what is needed is an easy-to-use and low cost estimation program for running on a personal computer. The program does not require costly initial equipment setup and has a high accuracy.

SUMMARY OF THE INVENTION

The present invention is designed to overcome the above-noted limitations, and toward this end, it contemplates the provision of a novel method and a computer program product for estimating material quantity in a building project.

In a first aspect of the invention, a method is provided. The method comprises providing a spreadsheet template including a summary worksheet and one or more input worksheets, each worksheet comprises a plurality of cells, for estimating a quantity of an item in a building project comprising one or more items, receiving a value of a parameter inputted by a user in a predetermined cell of an input worksheet, calculating the quantity of the item based on the value and a formula for the item, and generating a list comprising the quantity of the item on the summary worksheet.

The method, as above, may further comprise displaying the quantity of the item in another cell of the input worksheet in which the formula for the calculation of the item is embedded.

The method, as above, may further comprise calculating a quantity of a component 5 related to the item based on the quantity of the item and a formula for the component, and adding the quantity of the component to the list on the summary worksheet.

The method, as above, may further comprise displaying the quantity of the component in yet another cell of the input worksheet in which the formula for the calculation of the component is embedded.

In the method, the input worksheet may contain formulas for calculating one or more item and one or more component related to the item for one or more subgroup of the building project, and the summary worksheet may contain formulas for calculating a total quantity of an item or an related component in all input worksheets.

In the method as above, the subgroup of the project may include one or more of the following: floor, stud, header, ceiling, plywood, gables, roof frame, roofing, soffit, deck, porch, stair, window and door.

In the method as above, the formula for the item and the formula for the component are predefined according to one or more conditions specified for the building project and the formulas are modifiable according the conditions.

In a second aspect of the invention, a computer program product embodied in a computer readable storage medium for using in a computer for estimating a quantity of an item in a building project including one or more items is provided. The product comprises program codes for providing a spreadsheet template for estimating a quantity of an item in a building project comprising one or more items, wherein the spreadsheet template comprises a summary worksheet and one or more input worksheets, each worksheet comprises a plurality of cells, program codes for receiving a value of a parameter inputted by a user in a predetermined cell of an input worksheet, program codes for calculating the quantity of the item based on the value and a formula for the item, and program codes for generating a list comprising the quantity of the item on the summary worksheet.

The computer program product may further comprise program codes for displaying the quantity of the item in another cell of the input worksheet in which the formula for the calculation of the item is embedded.

The computer program product may further comprise program codes for calculating a quantity of a component related to the item based on the quantity of the item and a formula for the component, and program codes for adding the quantity of the component to the list on the summary worksheet.

The program product may further comprise program codes for displaying the quantity of the component in yet another cell of the input worksheet in which the formula for the calculation of the component is embedded.

In the program product as above, the input worksheet may contain formulas for calculating one or more item and one or more component related to the item for one or more subgroup of the building project, and the summary worksheet may contain formulas for calculating a total quantity of an item or an related component in all input worksheets.

In the above program product the subgroup of the project may include one or more of the following: floor, stud, header, ceiling, plywood, gables, roof frame, roofing, soffit, deck, porch, stair, window and door.

In the program product as above, the formula for the item and the formula for the component are predefined according to one or more conditions specified for the building project and the formulas are modifiable according the conditions.

The above program product may be executable by using a spreadsheet program and the spreadsheet program may be MICROSOFT EXCEL.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a screen snapshot of a summary worksheet "List",

FIG. 2 is a screen snapshot of a blank "Floor" worksheet,

FIG. 3 is a screen snapshot of the "Floor" worksheet with some data filled in,

FIG. 4 is a screen snapshot of a blank "Stud" worksheet,

FIG. 5 is a screen snapshot of a blank "Header" worksheet,

FIG. 6 is a screen snapshot of a blank "Ceiling" worksheet,

FIG. 7 is a screen snapshot of a blank "Plywood" worksheet,

FIG. 9 is a screen snapshot of a blank "Roof Frame" worksheet,

FIG. 10 is a screen snapshot of a blank "Roofing" worksheet,

FIG. 11 is a screen snapshot of a blank "Soffit" worksheet,

FIG. 12 is a screen snapshot of a blank "Deck" worksheet,

FIG. 13 is a screen snapshot of a blank "Porch" worksheet,

FIG. 14 is a screen snapshot of a blank "Stair" worksheet,

FIG. 15 is a screen snapshot of a blank "Window" worksheet,

FIG. 17 is a screen snapshot of the summary worksheet "List", after filling in some data, FIG. 18 is a screen snapshot of the summary worksheet "List", showing a pull-down menu under cell "ZERO QTY?", and FIG. 19 is a screen snapshot of the summary worksheet "List", displaying only X-marked items.

DETAILED DESCRIPTION OF THE INVENTION

Figure 8:
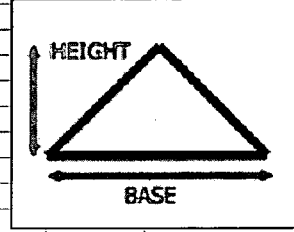
FIG. 8 is a screen snapshot of a blank "Gables" worksheet.

The present invention is embodied in a computer program product running under spreadsheet applications such as, but not limited to, MICROSOFT EXCEL. The program overcomes many of the above-mentioned problems involving computerized building material estimating systems using a digitizer. First of all, the program of the present invention does not require the use of the digitizer. Second, all of the formulas used to calculate material quantities in a takeoff estimating process are predefined in respective cells of a spreadsheet. These formulas are commonly known, or are defined according to common conditions specified in building codes. They may be modified according to change of conditions in particular projects by a user skilled in the art. Users with little or no estimating experience can use the program and learn about the estimating process as they progress. Third, to some people who have estimating experience, who are used to doing calculations by hand, and who are not familiar with personal computers, the program allows them to save time on the estimating process. Fourth, the program can be useful to contractors as well as professional estimators and lumber dealers. Finally, the program can be used for all types of project, from building a back deck at a private house to building a large commercial structure. It can also be used for building additions to an existing structure. Most programs on the market are used mainly for new residential constructions.

In one embodiment of the invention, the program is written in a spreadsheet format for execution by a spreadsheet program such as, but not limited to, MICROSOFT EXCEL. Using the program requires a personal computer with a spreadsheet program such as MICROSOFT EXCEL installed therein. To start a new estimation, an estimator opens up a program template under the spreadsheet program. The program template comprises a plurality of worksheets. Each worksheet is marked with a tab. The estimator is required to input numbers in different worksheets. Each worksheet, as the tab indicates, is focused on one or more particular area of the building project, such as roof, ceiling, deck, etc. There is no particular order to which worksheet one should start. It also does not matter if not all tabs are used in a takeoff. Some terminology that is specific to the building industry is used hereon.

The program comprises a summary worksheet named "List". This worksheet is used for generating a complete list of materials for a particular project. FIG. 1 is a screen snapshot of a blank summary worksheet "List". Note that the screen snapshots in this application may not include all the contents of the program, and they are for illustration purpose only.

On this summary worksheet, the estimator may fill in the job name and save the file by using menu item "Save As" under "File" menu (see menu bar) before inputting any further data. This step ensures that each job is saved separately and the original template provided by the program at the launch of the program can be used for future jobs. A backup blank template is available in case the estimator forgets to create a separate file for a particular job.

In the summary worksheet, building material items are listed by Category (Column A). Under each category there are one or more items described in the Description column (Column B). The Product column (column C) further defines different product item for the 10 same item name. Column QTY is for displaying quantities of each product item. Column LENGTH is for displaying length of each product item.

Besides the summary worksheet, there is at least one other worksheet for entering information in order to calculate a quantity of a product item. Worksheets may be designed in such a way that each of which is related to a particular area of the project. For example, as shown in FIG. 1, the first tab to the right of the "List" is "Floor". This worksheet Floor is used to calculate material for floor joists and beams in a structure. A snapshot of a blank "Floor" worksheet is shown in FIG. 2. The estimator is asked to input number of lally columns to be used for the project into cell I10, as indicated in FIG. 2. This number can be obtained by counting the corresponding objects on a blueprint.

After the number of lally columns is entered, as shown in FIG. 3, the estimator may start to calculate the quantity of floor joist material. Some rules may be set. For example, a rule for the entire program is that the estimator should always enter numbers in shaded (or colored) cells, and the results of the calculations will appear in respective corresponding non-shaded (or non-colored) cells. Generally, an input value entered in a shaded cell causes a corresponding non-shaded cell to display an output value that is the result of a calculation based on a predefined formula (hereinafter "formula") and the entered value. For calculating a quantity of a product item (such as joist), a value (such as a length of an area) is inputted. The quantity of the item is calculated by using a formula and the value. The same item may be needed in different areas, and different quantities of the item in the different areas are calculated separately. Total quantity of the item is displayed in the summary worksheet. All the formulas are predefined and embedded in respective cells and the formulas may be modified.

As an example, FIG. 3 shows the Floor worksheet after some numbers filled in. The formula embedded in cell D19 is displayed on the top of the worksheet below the menu 5 bars. The formula indicates that the value displayed in cell D19 (quantity of 12 ft 2×10 joist in a first floor area of 16 ft length) is a function of the data entered in cell C19 (length of area). The same product item (12 ft 2×10 joist) may also be needed in other areas such as the second floor. Therefore the quantity of it for the second floor is calculated by a separate formula. Total number if the item is added together and displayed in the summary worksheet. Throughout the program, numerous formulas are embedded in different worksheets. For example, in FIG. 1, the formula embedded in cell F29 is displayed. A person skilled in the art will appreciate the definition of each formula and the position of the formula in a particular cell of a particular worksheet. Formulas can be locked for protection from unintentional alternations, or be modified by a person skilled in the art.

Returning to FIG. 3, the program requires the estimator to select a joist size. For example, the estimator found on the blueprint that the architect has specified 2×10 material for the joist. In cell C16 the estimator enters 2×10.

Next, the estimator calculates floor joist quantities. In the cells under a header "JOIST LENGTH", the estimator enters the lengths of specific joists that can be extrapolated from the blueprints either by using dimensions given on the blueprints or using a scale ruler. For example, the lengths are 8, 10, 12, and 14 ft. In the cells under a header "LENGTH OF AREA", the estimator enters, in ft, the length of an area in which the lumber of the specific length is required. The program automatically displays how many joists are needed for the area under a header "QTY @16" O.C.". For example, thirteen 12 ft joists are need for an area of 16 ft long.

The next worksheet is "Stud", which is used for estimating quantities of studs used in all walls. A screen snapshot of the worksheet is shown in FIG. 4.

The estimator determines ceiling height and wall thickness for each floor of the structure by reading the information on the blueprint. Stud length and wall thickness values are entered in the shaded cells located at the top sections of the worksheet.

Next, the estimator uses plan dimensions or a scale ruler to find total linear footage of the exterior walls for each floor or area, fills in values in the shaded or colored cells for exterior walls. The quantities of studs for the exterior walls will appear in the "QTY @16" O.C." column. The estimator then counts the number of outside corners, windows, inside corners and doors of each floor or area and enters the values in the appropriate cells. Total number of studs to use for a floor or area is displayed in a cell under the heading "TOTAL STUD COUNT." This number is calculated based on a formula embedded in that cell.

Stud quantities for interior walls and/or curved walls can also be calculated in a similar manner.

Figure 16:
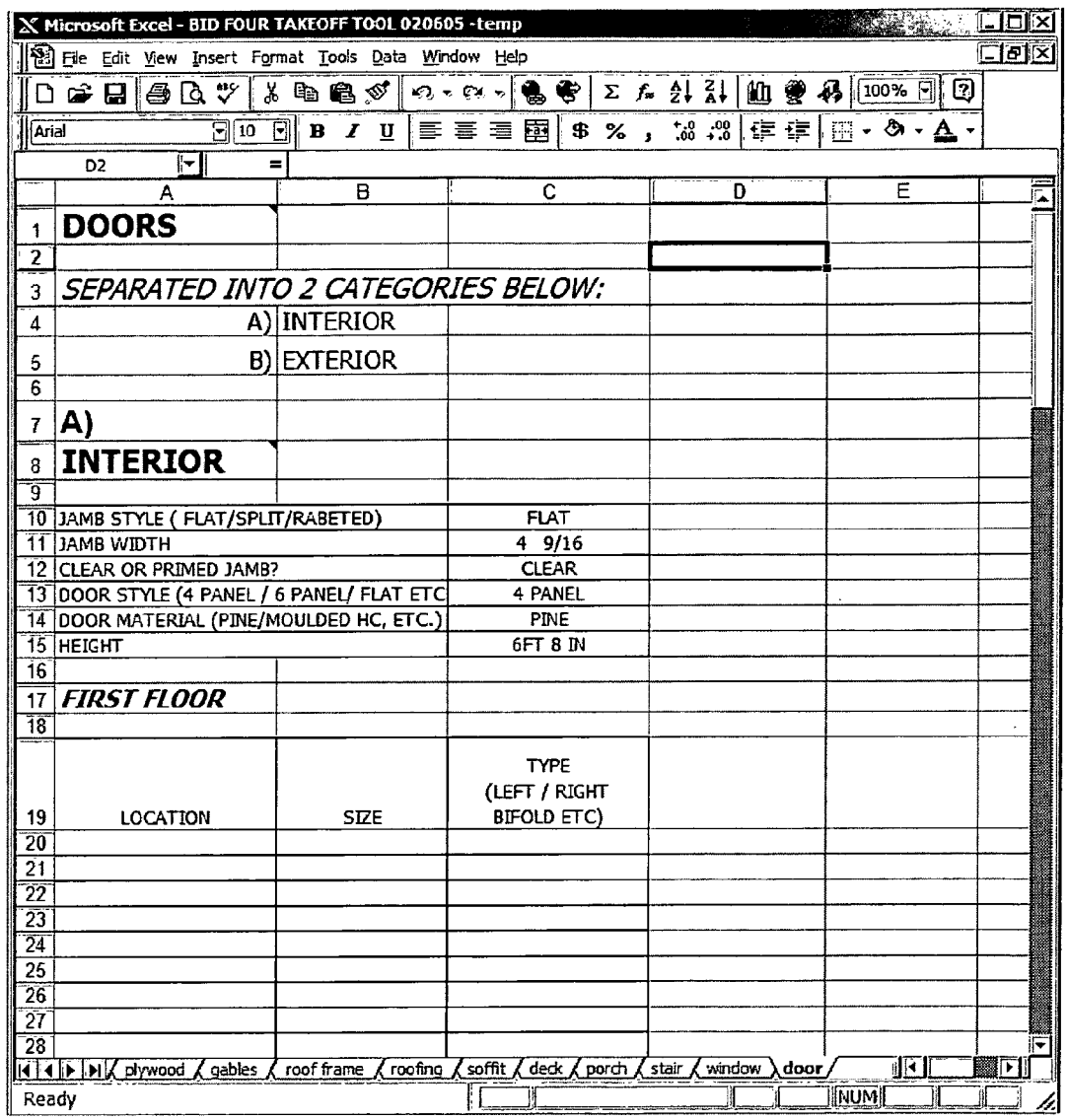
FIG. 16 is a screen snapshot of a blank "Door" worksheet.

Other worksheets for calculating other construction items include the following (listed by tab name), and a screen snapshot of each worksheet is indicated in parenthesis after each tab name:

Header (FIG. 5)
Ceiling (FIG. 6)
Plywood (FIG. 7)
Gables (FIG. 8)
Roof Frame (FIG. 9)
Roofing (FIG. 10)
Soffit (FIG. 11)
Deck (FIG. 12)
Porch (FIG. 13)
Stair (FIG. 14)
Window (FIG. 15)
Door (FIG. 16)

The above worksheets are substantially self-explanatory and persons skilled in the art fully understand the contents therein without further explanation.

The above information entered in the "Floor" worksheet (and any other worksheets) is reflected and organized in the summary worksheet "List". For example, as shown in FIG. 17, under "1ST FLOOR DECK" category, quantities of joist in each length (12, 10, 14, and 8 ft) is displayed as 13, 7, 15 and 6, respectively. Notice that partial quantities are rounded up or down to the nearest number. For example, the quantity of 8 ft joists of 2×10 was rounded up from 5.5 to 6.

In a "ZERO QTY?" column of the "List" sheet, there are cells marked with X's and O's. An X represents a product item that has been assigned a quantity for the material list and an O represents a product item that hasn't been calculated for the quantity or is not need for the project. A drop-down menu is embedded in the "ZERO QTY?" cell. A snapshot of the drop-down menu is shown in FIG. 18. By checking the item X on the menu, only the items marked with X will be displayed, as shown in FIG. 19. This way, the estimator does not have to print out all the items on the list. Only the ones that are needed for the project are printed out.

By using other drop-down menus in the "List" worksheet, such as "Description" and "Category", the list can be displayed according to different areas of the structure or other ways. To bring the list back to its original form, select "All" under every drop down menu.

An additional feature of the program is that after inputting information for a main item, e.g. studs, certain components related to the item, such as plates and sill seals, are calculated automatically. Many components on the list are calculated automatically, which saves a significant amount of time for the estimator.

The present invention has been disclosed in reference to specific examples therein. Numerous modifications and alternative arrangements may be devised by those skilled in the art without departing from the scope of the present invention, and the appended claims are intended to cover such modifications and arrangements.

What is claimed is:

1. A method, comprising:
providing on a display of a computer a spreadsheet template for estimating a quantity of an item used in a building project requiring one or more items, wherein the spreadsheet template comprises a tabbed summary worksheet and a plurality of tabbed input worksheets, each input worksheet relating to a particular subgroup of said building project, wherein a plurality of subgroups are categorized at least according to a floor or an area of said building project, and each input worksheet relating to such categorized subgroups comprising a plurality of cells marked for receiving a plurality of values, each value containing information about at least one dimension related to a particular floor or area of the building project,
receiving, in said computer, a user input selecting one of the plurality of tabbed input worksheets relating to a particular categorized subgroup of said building project,
displaying on said display the selected input worksheet in response to said user input,
receiving, in said computer at least the value of at least one dimension relating to the particular floor or area of the building project inputted by a user in a predetermined marked cell of an input worksheet,
calculating, in said computer, the quantity of the item based at least partly on said at least one dimension and a formula for calculating the quantity of the item required for said particular floor or area of the building project,
generating, on said display, a list comprising the quantity of the item on the summary worksheet, and
displaying on said display the quantity of the item in another cell of the input worksheet in which the formula for the calculation of the item is embedded, and
wherein if the selected input worksheet provides that said item has a related component, the method further comprises calculating, in said computer, a quantity of said component related to the item based on the quantity of the item and a formula for the component,
adding, in said computer, the quantity of the component to the list on the summary worksheet, and
displaying on said display the quantity of the component in yet another cell of the input worksheet in which the formula for the calculation of the component is embedded.

2. The method of claim 1, wherein the input worksheets contain formulas for calculating quantities of one or more items and quantities of one or more components related to the item for one or more subgroup, floor or area of the building project, and wherein the summary worksheet contains formulas for calculating a total quantity of an item or a related component in all input worksheets.

3. The method of claim 2, wherein the subgroup of the project includes one or more of the following: floor, stud, header, ceiling, plywood, gables, roof frame, roofing, soffit, deck, porch, stair, window and door.

4. The method of claim 1, wherein the formula for the item is predefined according to one or more conditions specified for the building project and the formula is modifiable according to the conditions.

5. The method of claim 1, wherein the formula for the component is predefined according to one or more conditions specified for the building project and the formula is modifiable according to the conditions.

6. The method of claim 1, further comprising printing the generated list on the summary worksheet in response to a further user input.

7. The method of claim 2, wherein said summary worksheet is configured to display calculated quantities of one or more items and calculated quantities of one or more components related to the item, only when said calculated quantities are not zero.

8. A non-transitory computer readable storage medium stored with program code, which when executed in a computer, cause the computer to perform:
providing a spreadsheet template for estimating a quantity of an item used in a building project requiring one or more items, wherein the spreadsheet template comprises a tabbed summary worksheet and a plurality of tabbed input worksheets, each worksheet to a particular subgroup of said building project, wherein a plurality of subgroups are categorized at least according to a floor or an area of said building project, and each input worksheet comprising a plurality of cells marked for receiving a plurality of values, each value containing information about at least one dimension related to a particular floor or area of the building project,
receiving a user input selecting one of the tabbed plurality of input worksheets relating to a particular categorized subgroup of said building project,
displaying the selected input worksheet in response to said user input,
receiving at least the value of at least one dimension relating to the particular floor or area of the building project inputted by a user in a predetermined marked cell of an input worksheet,
calculating the quantity of the item based at least partly on said at least one dimension and a formula for calculating the quantity of the item required for said particular floor or area of the building project,
generating a list comprising the quantity of the item on the summary worksheet, and
displaying the quantity of the item in another cell of the input worksheet in which the formula for the calculation of the item is embedded, and
wherein if the selected input worksheet provides that said item has a related component, said computer readable storage medium further comprises program code, which when executed cause the computer to perform:
calculating a quantity of a component related to the item based on the quantity of the item and a formula for the component,
adding the quantity of the component to the list on the summary worksheet, and
displaying the quantity of the component in yet another cell of the input worksheet in which the formula for the calculation of the component is embedded.

9. The non-transitory computer readable storage medium of claim 8, wherein the input worksheets contain formulas for calculating quantities of one or more items and quantities of one or more components related to the item for one or more subgroup, floor or area of the building project, and wherein the summary worksheet contains formulas for calculating a total quantity of an item or a related component in all input worksheets.

10. The non-transitory computer readable storage medium of claim 8, wherein the subgroup of the project includes one or more of the following: floor, stud, header, ceiling, plywood, gables, roof frame, roofing, soffit, deck, porch, stair, window and door.

11. The non-transitory computer readable storage medium of claim 8, wherein the program product is executable by using a spreadsheet program.

12. The non-transitory computer readable storage medium of claim 8, wherein the formula for the item is predefined according to one or more conditions specified for the building project and the formula is modifiable according to the conditions.

13. The non-transitory computer readable storage medium of claim 8, wherein the formula for the component is predefined according to one or more conditions specified for the building project and the formula is modifiable according to the conditions.

14. The non-transitory computer readable storage medium of claim 8, further comprising program code, which when executed cause the computer to perform:
   printing the generated list on the summary worksheet in response to a further user input.

15. The non-transitory computer readable storage medium of claim 9, further comprising program code, which when executed cause the computer to perform displaying calculated quantities of one or more items and calculated quantities of one or more components related to the item, only when the calculated quantities are not zero.

\* \* \* \* \*